(12) United States Patent
Warden et al.

(10) Patent No.: US 6,741,857 B1
(45) Date of Patent: May 25, 2004

(54) ACCESS METHOD AND APPARATUS FOR A WIRELESS LOCAL LOOP TELEPHONE NETWORK

(75) Inventors: James Paul Warden, Ft. Worth, TX (US); Jason Haines Losh, Arlington, TX (US); Larry Svec, Wauconda, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/566,716

(22) Filed: May 9, 2000

(51) Int. Cl.[7] ................................................. H04Q 7/26
(52) U.S. Cl. ..................... 455/423; 455/426.2; 455/557
(58) Field of Search ................................. 455/550, 552, 455/553, 557, 144, 403, 414, 428, 423, 556, 555, 425, 426, 426.1, 426.2, 129.4

(56) References Cited

U.S. PATENT DOCUMENTS

| | | | | | |
|---|---|---|---|---|---|
| 5,884,148 | A | * | 3/1999 | Bilgic et al. | 455/74.1 |
| 5,930,727 | A | * | 7/1999 | Henry, Jr. | 455/557 |
| 6,104,909 | A | * | 8/2000 | Baldwin et al. | 455/425 |
| 6,124,949 | A | * | 9/2000 | West et al. | 358/434 |
| 6,169,883 | B1 | * | 1/2001 | Vimpari et al. | 455/67.1 |
| 6,169,896 | B1 | * | 1/2001 | Sant et al. | 455/424 |
| 6,192,055 | B1 | * | 2/2001 | Rasanen | 370/465 |
| 6,233,257 | B1 | * | 5/2001 | Yoshida et al. | 370/508 |
| 6,353,748 | B1 | * | 3/2002 | Cho | 455/557 |
| 6,366,772 | B1 | * | 4/2002 | Arnson | 455/415 |
| 6,445,916 | B1 | * | 9/2002 | Rahman | 455/423 |

* cited by examiner

*Primary Examiner*—Cong Van Tran
(74) *Attorney, Agent, or Firm*—Scott M. Garrett

(57) ABSTRACT

A fixed wireless terminal utilizes a method for accessing a wireless local loop (WLL) telephone network to provide both a diagnostic mode of operation and a digital data delivery mode of operation in a system which utilizes a protocol which provides support for only the digital data delivery mode of operation. The method includes setting up a call to a WLL device which includes a mobile station and a communication interface. The mobile station receives call setup signals followed optionally by a predetermined guard time. The communication interface is responsive to a predetermined guard time for switching to a diagnostic mode, and in the absence of the predetermined guard time being transmitted, the communication interface maintains the digital data delivery mode.

12 Claims, 6 Drawing Sheets

| 602 | CALL PROCESSING |
| --- | --- |
| 604 | DIAL TONE |
| 606 | CALL PROGRESS TONES |
| 608 | PHONE NUMBER DIALING PLAN |
| 610 | DATA RATE NEGOTIATION |
| 612 | AIR INTERFACE MAINTENANCE |
| 614 | SERVICE OPTION COMMAND ROUTINE |
| 616 | DIAGNOSTIC MODE SWITCH COMMAND ROUTINE |
| 618 | DIAGNOSTIC TEST ROUTINE |
| 620 | PROBLEM REPORTING ROUTINE |
| 622 | CODE PLUG DOWNLOAD ROUTINE |
| 624 | SOFTWARE DOWNLOAD ROUTINE |

512

ACCESS METHOD AND APPARATUS FOR A WIRELESS LOCAL LOOP TELEPHONE NETWORK

BACKGROUND OF THE INVENTION

1. Field of the Invention

This invention relates in general to wireless local loop telephone networks, and more specifically to a method and apparatus for providing a maintenance and diagnostic mode entry access to a wireless local loop telephone network.

2. Description of the Related Art

FIG. 1 is an example of a wireless communication system 100 widely used today. Calls can be made from, or received by, a conventional telephone 102. Calls originated from the telephone 102 are routed through the public switched telephone network 104 (PSTN) to an inter-working function 106 (IWF) which processes the call for transmission over the wireless communication system 100. The call is routed to a base station 108 for transmission via antenna 110 to, in a first instance, a cellular telephone depicted by mobile station 114, or in a second instance, to a local loop wireless (WLL) telephone network, depicted by a fixed wireless terminal 118 (FWT) which are located within the coverage area provided by the base station 108. The transmitted calls are received by the mobile station 114 via antenna 112, and by the fixed wireless terminal 118 via antenna 116 within the coverage area. Calls can also be originated from the mobile station 114 or the fixed wireless terminal 118 to the telephone 102, from the mobile station 114 to the fixed wireless terminal 118, and from the fixed wireless terminal 118 to the mobile station 114. The transmission of calls between the telephone 102 and the mobile station 114 is well known to one of ordinary skill in the art, for such systems as mobile radio telephone services, cellular telephone systems, and PCS telephone systems. The transmission of calls between the telephone 102 and the fixed wireless terminal 118 used in wireless local loop telephone networks is also well known to one of ordinary skill in the art.

As previously described above, the prior art wireless local loop telephone networks enabled a number of conventional telephones or other wired communication devices to communicate through the wireless communication system to either telephones connected to a public switched telephone network or cellular phones. When a wireless local loop telephone network was utilized as described above, the transmission protocols used in such systems placed limitations on the types of transmissions which can be handled. Such systems, as described above, regularly provided analog signaling for use with conventional telephones, and in addition provided an OAMP (Operation, Authentication, Maintenance and Provisioning) mode which enabled remote diagnostic monitoring of the fixed wireless terminal 118 and the wireless local loop telephone network. One example of such a prior art system is one utilizing the IS-95 communication protocol. In such prior art systems, all communication directed to the fixed wireless terminal 118 required a separate phone number to be assigned to all locally connected phones and separately to address the fixed wireless terminal 118 to enable the OAM&P mode of operation. No provision was made in such prior art systems for providing communication between devices utilizing digital data without changing the protocols between an end user data mode and an OAM&P mode.

Thus what is needed is a method and apparatus for providing both an OAMP mode of operation and support for digital data devices while maintaining the use of the conventional wireless communication protocols in use today.

DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DETAILED DESCRIPTION OF THE INVENTION

Figure 1:
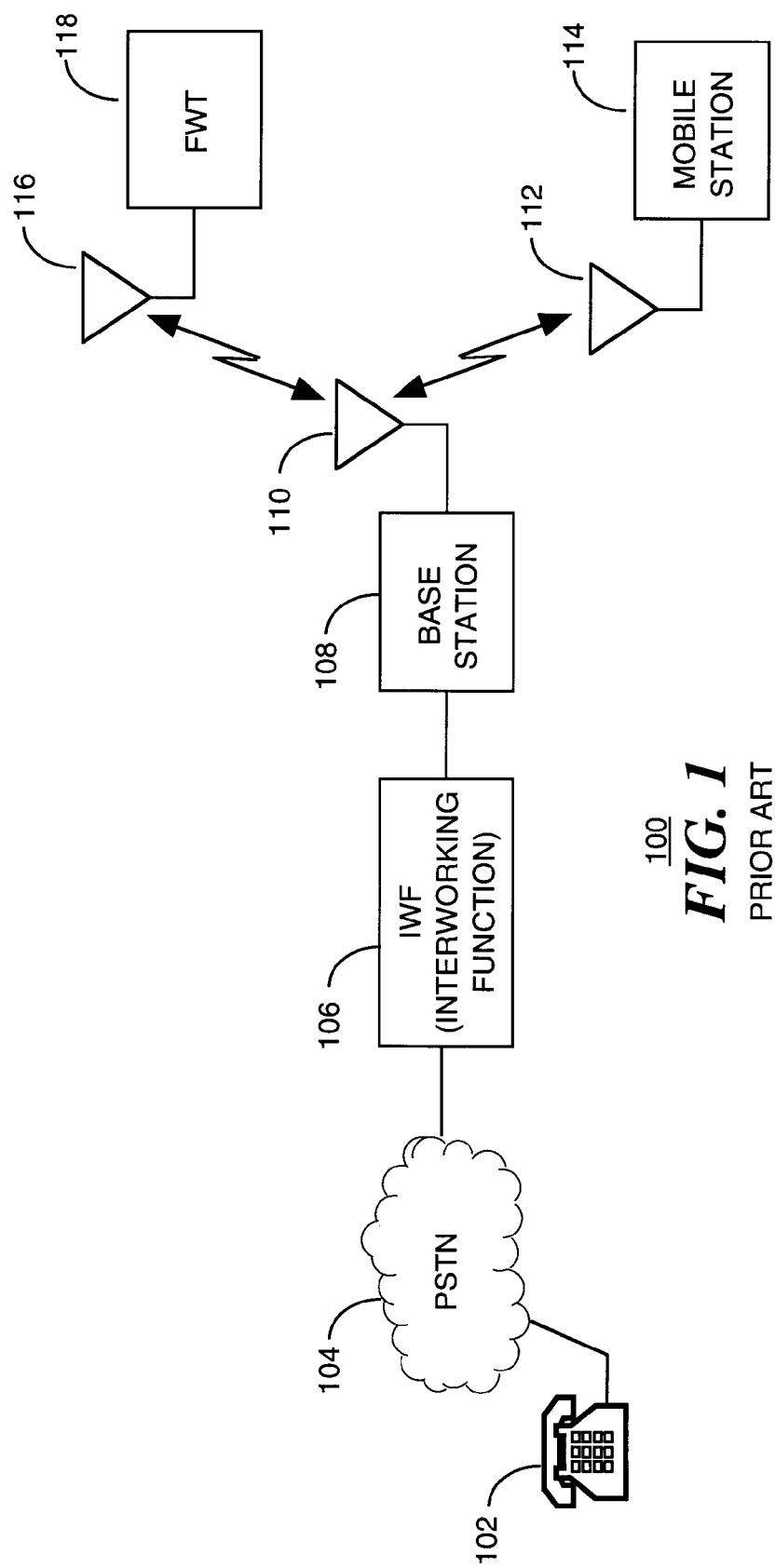
FIG. 1 is an electrical block diagram of a typical wireless communication system.
Figure 2:
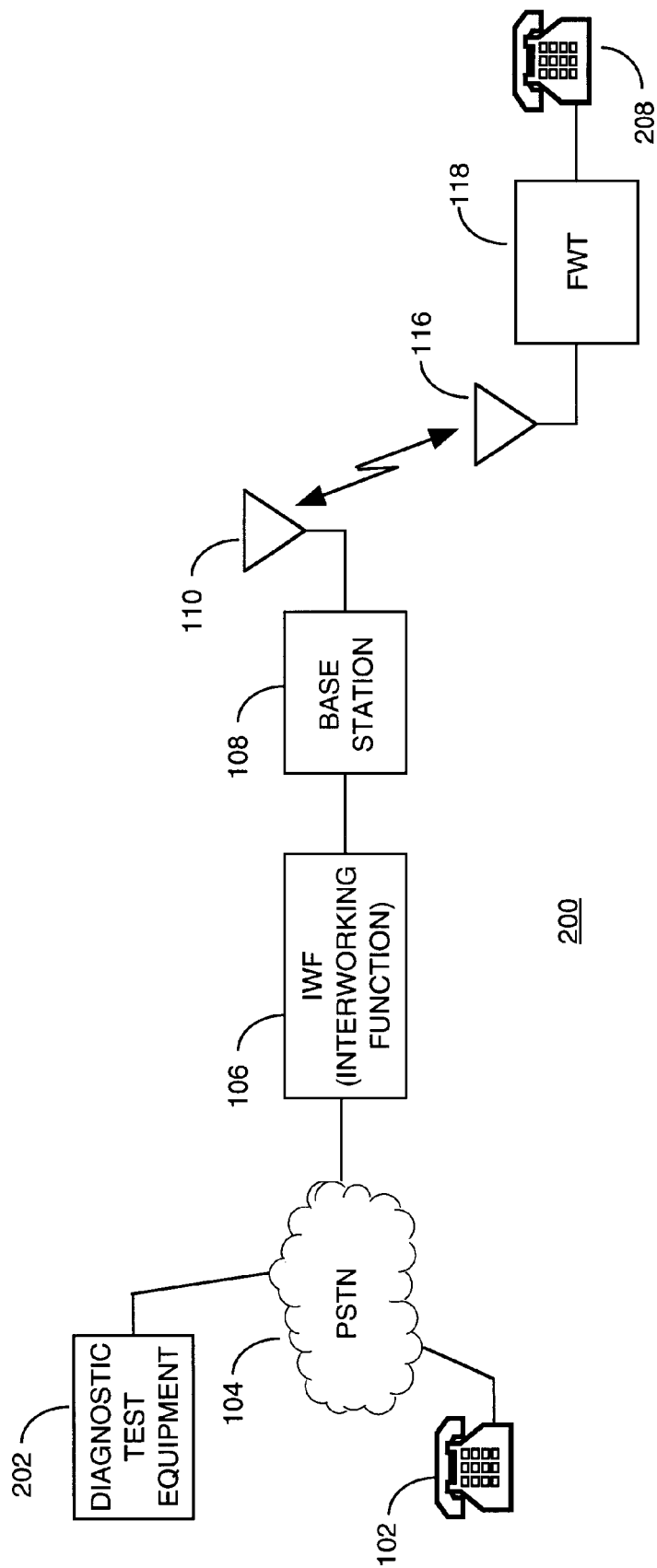
FIG. 2 is an electrical block diagram of a wireless communication system in accordance with the present invention.
Figure 4:
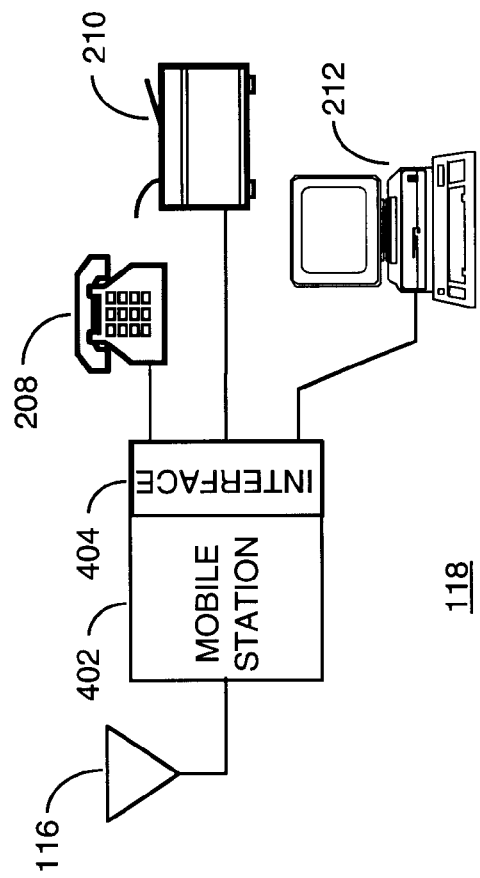
FIG. 4 is an electrical block diagram of a wireless local loop telephone network in accordance with the present invention.
Figure 3:
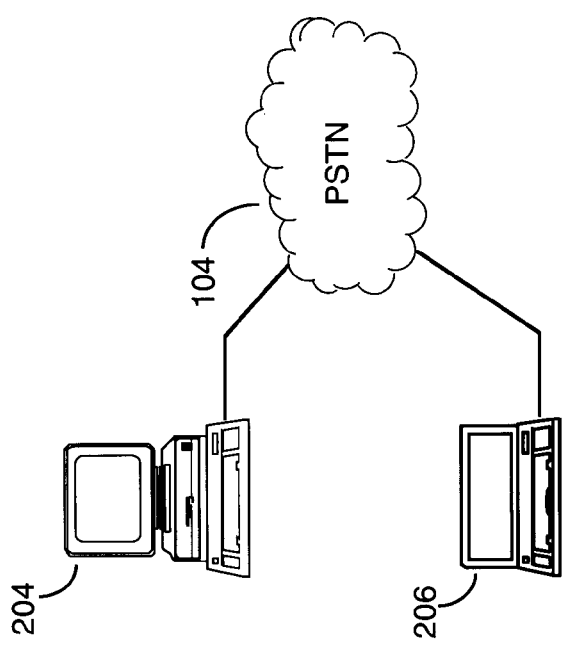
FIG. 3 is an electrical block diagram of the diagnostic test, equipment utilized in accordance with the present invention.

FIG. 2 is an electrical block diagram of a wireless communication system 200 in accordance with the present invention. The basic operation for the transmission of a regular phone call through the wireless communication system 200 is described in FIG. 1 above. The understanding of the operation of the wireless communication system 200 is best understood by way of FIGS. 2, 3, and 4, wherein FIG. 3 is an electrical block diagram of the diagnostic test equipment utilized in accordance with the present invention, and FIG. 4 is an electrical block diagram of a wireless local loop (WLL) telephone network in accordance with the present invention.

In addition to the conventional elements described in FIG. 1 above, the wireless communication system 200 in accordance with the present invention is a wireless local loop (WLL) telephone network which utilizes diagnostic test equipment 202 which can be connected to the wireless communication system 200 through the public switched telephone network 104. The diagnostic test equipment 202 can be provided by both fixed location devices 204 and portable devices 206, as shown in FIG. 3. Examples of fixed location devices 204, are personal computing systems, such as manufactured by Sun Microsystems of Palo Alto Calif., or Compaq Computer Corporation of Houston Tex. Examples of portables devices 206 are, laptop computing devices, hand held computing devices, and personal digital assistants, such as manufactured by IBM of Armonk N.Y., or Dell Computer Corporation of Round Rock Tex. When the diagnostic test equipment 202 communicates via the public switched telephone network 104, a modem (not shown) is generally utilized to enable communication, as is well known to one of ordinary skill in the art. As shown in FIG. 4, unlike the prior art communication systems 100, the wireless communication system 200 in accordance with the present invention includes a wireless local loop (WLL) telephone network which provides by way of example access to wired analog telephones 208, fax machines 210 and computer systems 212. Connection to the fax machines 210 and computer systems 212 can be provided via analog modems, and unlike the prior art, can also be provided directly via digital data ports. Also unlike the prior art wireless communication system 100, the wireless communication system 200 in accordance with the present invention supports both analog and digital data transmissions as well as provides an OAMP mode of operation necessary to set up, reprogram, monitor, and diagnose problems within the wireless local loop (WLL) telephone network. The fixed wireless terminal 118 shown in FIG. 4 includes a mobile station 402 and a communication interface 404, to be described in further detail below. The communication interface 404 provides for the transmission of analog signals to analog signaling devices such as phones and other electronic devices utilizing modems, and digital signals to devices using digital signaling, such as computers and other data centric devices.

Figures 5, 6:
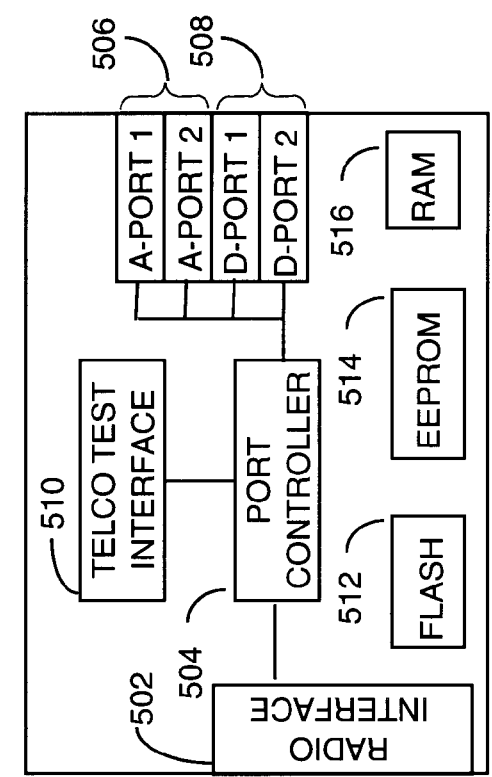
FIG. 5 is an electrical block diagram of the fixed wireless terminal in accordance with the present invention.
FIG. 6 is a diagram depicting software routines utilized in the fixed wireless terminal of FIG. 5.

FIG. 5 is an electrical block diagram of the communication interface 404 in accordance with the present invention. The communication interface 404 includes a radio interface 502 which receives signals generated by the mobile station 402. These signals may be either in an analog or digital signaling format. The radio interface couples to a port controller 504 which controls the operation of the fixed wireless terminal 118. The port controller is preferably a microcomputer, such as an MC68300 microcomputer manufactured by Motorola Inc. of Schaumburg Ill. Analog signals which are received are directed to one or more analog ports 506, such as analog port 1 (A-PORT 1) and analog port 2 (A-PORT 2) which typically utilize conventional RJ-11 jacks for connection, of which two are shown by way of example. Digital signals which are received are directed to one or more digital data ports 508, such as digital port 1 (D-PORT 1) and digital port 2 (D-PORT 2) which typically utilize conventional RJ-45 jacks for connection, of which two are shown by way of example. The analog ports enable communication with conventional telephones, i.e. analog telephone calls, and other devices which utilize a modem for communication. The digital ports enable communication of digital data directly to devices capable of receiving and processing digital data, such as a computer system or network. Control code, such as depicted in FIG. 6, is stored in a flash memory 512 in the communication interface 404. It will be appreciated that the control code can also be stored in other forms of nonvolatile memory devices, such as a ROM or EPROM device. Customer specific information is stored in EEPROM 514 (electrically erasable programmable read only memory). Examples of customer specific information which is stored includes the phone numbers associated with the fixed wireless terminal 118 which address the telephone(s) 208 and other communication devices. RAM 516 (random access memory) is utilized to stored local variables generated during the execution of the control code. Unlike the prior art of record, the fixed wireless terminal 118 also includes a telco test interface 510 which controls the operation of the fixed wireless terminal 118 during the OAMP mode of operation, as will be described below.

FIG. 6 is a diagram depicting software routines which provide the control code utilized in the communication interface 404 of FIG. 5. Unlike the prior art, the fixed wireless terminal 118 is capable of directing calls to either the one or more analog ports 506, to the one or more digital data ports 508, or to the telco test Interface 510. Selection of the mode of operation for conventional communication in accordance with the present invention is via call setup signals 802 shown in FIG. 8 to be described below. The control code utilized to enable this operation includes a call processing routine 602, a dial tone generation routine 604, a call progress tones routine 606, a phone number dialing plan routine 608, a data rate negotiation routine 610, and an air interface maintenance routine 612 which are utilized by the port controller 504. The call processing routine 602 enables the overall management of a call from start to finish. The dial tone generation routine 604 enables the user to hear the tone that is associated with a phone being off hook and ready to dial a number. The call progress tones routine 606 enables the user to hear the various network tones as the call progresses to the connected state. The phone number dialing plan routine 608 enables the user to enter the desired phone number and can allow for shortcuts to dialing numbers requiring area codes. The data rate negotiation routine 610 enables the fixed wireless terminal 118 to establish a digital data session with the base station 108 at the negotiated data rate. The air interface maintenance routine 612 enables the fixed wireless terminal 118 to maintain an RF connection with the base station 108. As described above the fixed wireless terminal 118 is capable of directing calls utilizing analog signaling and digital signaling to one or more analog ports 506 and one or more digital data ports 508, thereby providing for both analog and digital communication within the wireless local loop telephone network serviced by the fixed wireless terminal 118.

Figure 9:
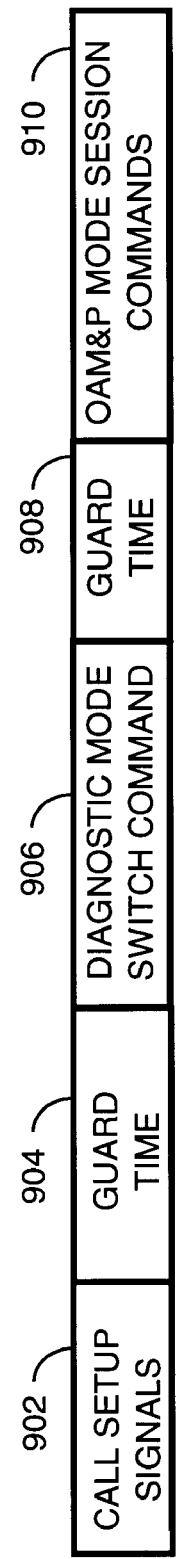
FIG. 9 is a protocol diagram depicting the establishment of an OAM&P mode call in accordance with the present invention.

Selection of the mode of operation for the diagnostic mode in accordance with the present invention is via the call setup signals 902, a guard time 904 and guard time 908 and a diagnostic mode switch command 906 as shown in FIG. 9 to be described below. Control code is provided which controls the operation of the OAMP mode of operation. Unlike the prior art of record,,the OAMP mode of operation is selected within the fixed wireless terminal 118 by way of a diagnostic mode command shown in FIG. 9, to be described in detail below. The control code utilized to execute the OAMP mode of operation includes a service option command routine 614, a diagnostic mode switch command routine 616, a diagnostic test routine 618, a problem reporting routine 620, a code plug download routine 622, and a software download routine 624. The service option command routine 614 enables the appropriate digital data service option for communication between the fixed wireless terminal 118 and the base station, the diagnostic mode switch command routine 616 enables the fixed wireless terminal 118 to switch from a normal digital data session to an OAMP mode of operation wherein received data is routed internally such that an OAMP session can be established, the diagnostic test routine 618 enables diagnostic testing of the various subsystems of the fixed wireless terminal 118 and attached telephone system, the problem reporting routine 620 enables detected faults in the fixed wireless terminal 118 or attached telephone system to be reported to the base station, the code plug download routine 622 enables customer unique information such as but not limited to the telephone number to be updated in the fixed wireless terminal 118, and the software download routine 624 enables the fixed wireless terminal 118 operating software to be updated or completely replaced.

Figure 7:
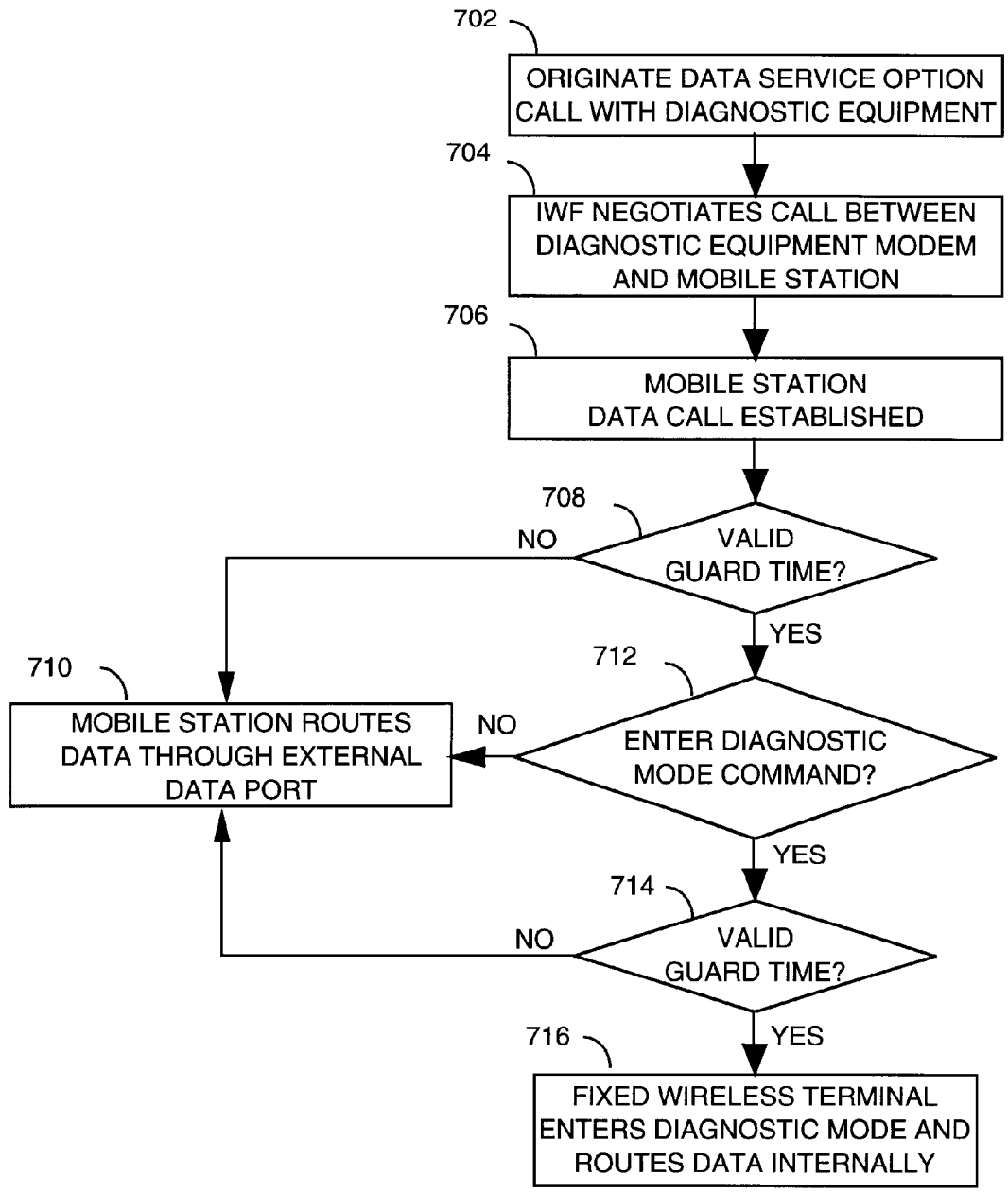
FIG. 7 is a flow chart depicting the operation of the wireless local loop telephone network in accordance with the present invention.

FIG. 7 is a flow chart depicting the operation of the wireless local loop (WLL) telephone network in accordance with the present invention. The diagnostic test equipment 202 is utilized to originate a data service option call, at step 702. The inter-working function 106 negotiates the call between the modem provided in the diagnostic test equipment 202 and the mobile station 402 using a conventional communication protocol, at step 704, such as the IS-95 signaling protocol. A data call with the mobile station 402 is established, at step 706. The port controller 504 determines whether a valid guard time 904 has been received during which unmodulated carrier is transmitted. When a valid guard time 904 is not received, at step 708, the mobile station 402 routes the received data session signals through the external data port via digital data ports 508 under the control of the port controller 504, at step 710. When the port controller 504 determines that a valid guard time 904 is received, at step 708, the port controller 504 determines whether a diagnostic mode entry command 906 is received. When a diagnostic mode entry command 906 is not received, at step 712, the mobile station 402 again routes the received data session signals through the external data port via digital data ports 508 under the control of the port controller 504, at step 710. When a diagnostic mode entry command 906 is received, at step 712, the port controller 504 again determines whether a valid guard time 908 has been received, at step 714. When a valid guard time 908 is not received, at step 714, the mobile station 402 again routes the received data session signals through the external data port via digital data ports 508 under the control of the port controller 504, at step 710. When the port controller 504 determines that a valid guard time 908 is again received, at step 714, the fixed wireless terminal 118 enters the diagnostic mode and the recovered data delivered from the mobile stations 402 is routed internally to the telco test interface 510, at step 716. The telco test interface 510 processes the diagnostic test routine 618, and the problem reporting routine 620. The data received can also include data required to reprogram the telephone number and other customer unique information stored in the EEPROM 514, software to upgrade the operation of the fixed wireless terminal 118, and diagnostic test commands.

Figure 8:
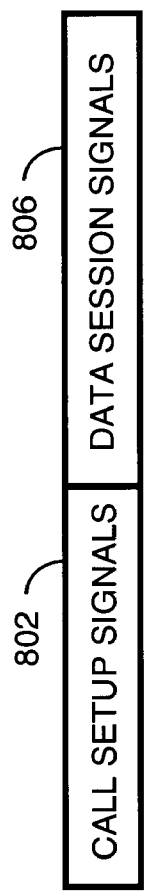
FIG. 8 is a protocol diagram depicting the establishment of analog and data session calls in accordance with the present invention.

FIG. 8 is a protocol diagram depicting the establishment of conventional digital data session calls in accordance with the present invention. The inter-working function generates call setup signals 802 which are used to establish communication with a mobile station 114 or a fixed wireless terminal 118. Following the establishment of communication, data session signals 806 are transmitted which enable the transfer of digital data between the calling device and a device capable of receiving digital data which is connected to the wireless local loop telephone network via fixed wireless terminal 118. Connection to the mobile station 114 is established in the same manner.

FIG. 9 is a protocol diagram depicting the establishment of an OAMP mode call in accordance with the present invention. The interworking function 106 generates call setup signals 902 which are used to establish communication with the fixed wireless terminal 118, followed by a first guard time 904. Following the establishment of communication, a diagnostic mode switch command 906 is transmitted followed by a guard time 908. OAMP mode commands 910 are then transmitted which enable diagnosing problems within the wireless local loop telephone network, or downloading software and customer specific information to the wireless local loop telephone network via fixed wireless terminal 118. The first guard time 904 and the second guard time 908 are generally utilized to reduce the probability of errantly switching to the diagnostic mode, while the use of the diagnostic mode switch command 906, would allow other commands to be substituted to control yet other wireless local loop telephone network functions.

It will also be appreciated, that the decision to enter into the diagnostic mode such as described above, can also be made on the basis of receiving a guard time, upon receiving a guard time followed by a diagnostic mode switch command, upon receiving a diagnostic switch command, or upon receiving a diagnostic mode switch command followed by a guard time, or upon receiving any combination of guard time and diagnostic mode switch command.

In summary, a method and apparatus has been described which allows the transmission of digital data to a wireless local loop telephone network using a conventional communication protocol, such as IS-95, and also allows establishing a diagnostic mode wherein the wireless local loop telephone network can be monitored to determined whether or not there are problems which must be resolved. As described above, the transfer of control from the port controller 504, which controls the delivery of telephone calls through the one or more analog ports 506, or to the one or more digital data ports 508, to the telco test interface 510 is accomplished without any changes to the call setup signals, thus the communication protocol used to deliver telephone calls and digital data signals to the wireless local loop telephone network is unchanged from the conventional wireless communication protocol. While entry into the diagnostic mode has been specifically described as being provided by the transmission of a first guard time 904 followed by the diagnostic mode switch command 906 further followed by a second guard time 908, While specific embodiments of this invention have been shown and described, further modifications and improvements will occur to those skilled in the art. All modifications which retain the basic underlying principles disclosed and claimed herein are with the scope and spirit of the present invention.

We claim:

1. A method for accessing a wireless local loop telephone network to provide both a diagnostic mode of operation and a digital data delivery mode of operation in a system utilizing a protocol which provides support for only the digital data delivery mode of operation, comprising:

setting up a call to a wireless local loop device, and in response to the call being set up with the wireless local loop device;

detecting, at the wireless local loop device, a predetermined guard time, and in response thereto, switching to a diagnostic mode at the wireless local loop device; and in an absence of detecting the predetermined guard time, maintaining the digital data delivery mode at the wireless local loop device;

wherein the call to the wireless local loop device is set up using call setup signals which are used to select between an analog telephone call and a digital data call.

2. The method according to claim 1, further comprising detecting a transmission of a diagnostic mode switch command and in response thereto switching to the diagnostic mode, and in the absence of detecting the diagnostic mode switch command, maintaining the digital data delivery mode.

3. The method according to claim 1, wherein the call setup signals include a service option which is used to select between the analog telephone call and the digital data call.

4. A fixed wireless terminal which provides access to a wireless local loop telephone network to provide both a diagnostic mode of operation and a digital delivery mode of operation in a system utilizing a protocol which provides only a diagnostic mode of operation, comprising:

a mobile station for receiving call setup signals followed optionally by a predetermined guard time; and a communication interface which is responsive to predetermined guard time for switching to a diagnostic mode, and in an absence of the predetermined guard time being transmitted, said communication interface maintaining the digital data delivery mode;

wherein said communication interface is responsive to the call setup signals for selecting an analog port for completing an analog telephone call, and for selecting a digital data port for completing a digital data call.

5. The fixed wireless terminal according to claim 4, wherein said mobile station further receives a diagnostic mode switch command, and wherein said communication interface is responsive to the diagnostic mode switch command for switching to the diagnostic mode, and wherein in an absence of the diagnostic mode switch command being transmitted, said communication interface maintaining the digital data delivery mode.

6. The fixed wireless terminal according to claim 4, wherein the call setup signals include a service option which is used to select between the analog port and the digital data port in response to the service option being transmitted.

7. A method for accessing a wireless local loop telephone network to provide both a diagnostic mode of operation and a digital data delivery mode of operation in a system utilizing a protocol which provides support for only the digital data delivery mode of operation, comprising:

setting up a call to a wireless local loop device, and in response to the call being set up with the wireless local loop device detecting a diagnostic mode switch command at the wireless local loop device, and in response thereto, switching to a diagnostic mode at the wireless local loop device; and in an absence of detecting the diagnostic mode switch command, maintaining the digital data delivery mode at the wireless local loop device;

wherein the call to the wireless local loop device is set up using call setup signals which are used to select between an analog telephone call and a digital data call.

8. The method according to claim 7, further comprising further detecting a transmission of a predetermined guard time and in response thereto switching to the diagnostic mode, and in the absence of detecting the predetermined guard time, maintaining the digital data delivery mode.

9. The method according to claim 8, wherein the call setup signals include a service option which is used to select between the analog telephone call and a digital data call.

10. A fixed wireless terminal which provides access to a wireless local loop telephone network to provide both a diagnostic mode of operation and a digital data delivery mode of operation in a system utilizing a protocol which provides only a diagnostic mode of operation, comprising:

a mobile station for receiving call setup signals followed optionally by a diagnostic mode switch command; and a communication interface which is responsive to diagnostic mode switch command for switching to a diagnostic mode, and in an absence of the diagnostic mode switch command being transmitted, said communication interface maintaining the digital data delivery mode;

wherein said communication interface is responsive to the call setup signals for selecting an analog port for completing an analog telephone call, and for selecting a digital data port for completing a digital data call.

11. The fixed wireless terminal according to claim 10, wherein said mobile station further receives a predetermined guard time, and wherein said communication interface is responsive to the predetermined guard time for switching to the diagnostic mode, and wherein in an absence of the predetermined guard time being transmitted, said communication interface maintaining the digital data delivery mode.

12. The fixed wireless terminal according to claim 10, wherein the call setup signals include a service option which is used to select between the analog port and the digital data port in response to the service option being transmitted.

* * * * *